(12) United States Patent
Casas et al.

(10) Patent No.: US 6,659,434 B1
(45) Date of Patent: Dec. 9, 2003

(54) COLLAPSIBLE SPARGER

(75) Inventors: Ralph E. Casas, Deer Park, TX (US); Henry J. Semerak, Houston, TX (US); Rodney D. Chevalier, Vidor, TX (US); Willibrord A. Groten, Houston, TX (US); Clifford S. Crossland, Sarnia (CA)

(73) Assignee: Catalytic Distillation Technologies, Pasadena, TX (US)

( * ) Notice: Subject to any disclaimer, the term of this patent is extended or adjusted under 35 U.S.C. 154(b) by 125 days.

(21) Appl. No.: 10/044,617

(22) Filed: Jan. 11, 2002

(51) Int. Cl.[7] .................................................. B01F 3/04
(52) U.S. Cl. ..................... 261/121.1; 261/124; 29/401.1
(58) Field of Search ........................ 261/121.1, 122.1, 261/122.2, 124, DIG. 70; 29/401.1

(56) References Cited

U.S. PATENT DOCUMENTS

| | | | | |
|---|---|---|---|---|
| 1,473,160 A | * | 11/1923 | Robbins | 261/121.1 |
| 3,339,901 A | * | 9/1967 | Walker | 261/124 |
| 5,391,356 A | * | 2/1995 | Thorman | 422/143 |
| 6,128,792 A | * | 10/2000 | Mathews | 4/508 |

* cited by examiner

Primary Examiner—C. Scott Bushey
(74) Attorney, Agent, or Firm—Kenneth H. Johnson

(57) ABSTRACT

A collapsible sparger for insertion into a vessel through a flanged opening is disclosed having a central tubular conduit having a plurality of rotatable members along its length. The rotatable members may be rotated and secured into position after insertion.

6 Claims, 1 Drawing Sheet

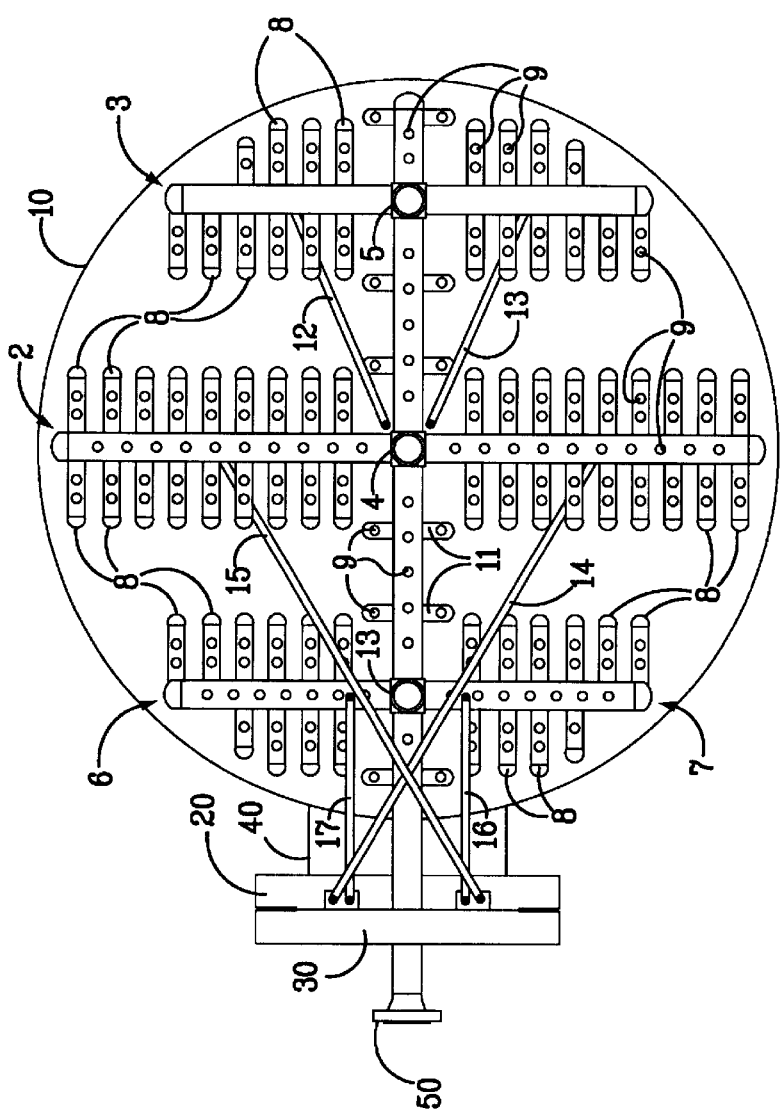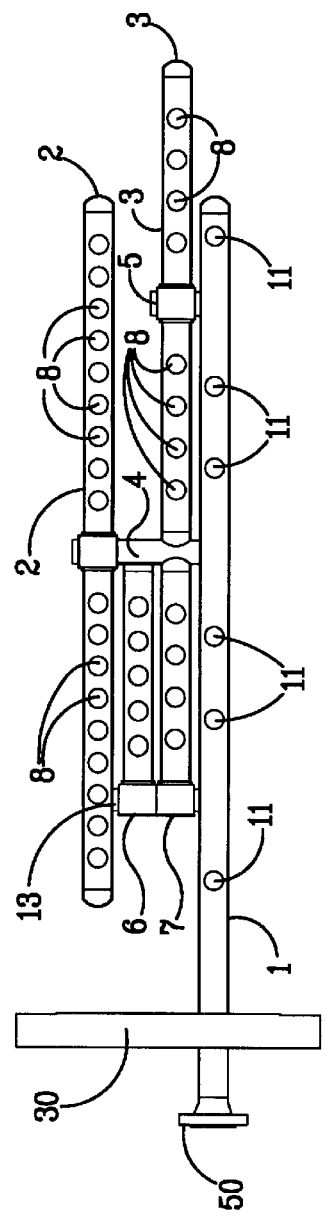

COLLAPSIBLE SPARGER

BACKGROUND OF THE INVENTION

1. Field of the Invention

The present invention relates to an apparatus for injecting a gas feed, such as hydrogen, into a liquid in a vessel. More particularly the invention relates to a sparger that may be installed through a flanged opening in a vessel. More particularly the invention relates to a collapsible sparger that may be inserted through a flanged opening and then opened into a configuration that covers substantially the entire cross section of the vessel.

2. Related Information

A sparger is used to distribute a liquid or gas throughout an open space. In the case of hydrotreating processes hydrogen must be fed to a reactor and distributed evenly throughout the vessel. If the flow is co-current downflow across a multitude of fixed beds there are generally mixing apparatus between the beds similar to distillation trays to spread the liquid and vapor across the bed below. In countercurrent reactors the hydrogen is fed below the catalyst bed and must be distributed evenly across the cross section of the reactor. A sparger provides the mechanism for obtaining this distribution. The sparger must therefore cover the cross section area of the reactor which is normally cylindrical.

In new construction the sparger may be placed in the reactor as it is built. However, in retrofits of existing distillation columns, which may be a preferred construction, the sparger must be placed below all of the internals of the column without their removal. Generally the openings available for insertion of a sparger are much too small to allow a fixed sparger having a cross section area sufficient to cover the reactor to be inserted.

SUMMARY OF THE INVENTION

The present invention is a collapsible sparger and method of inserting the sparger. The sparger comprises:

(a) a central tubular conduit having openings through the walls thereof, and having a distal insertion end and a proximal end such that the proximal end extends outward of said vessel through said flange when said distal end is inserted into the vessel;

(b) a plurality of rotatable tubular members rotatably secured along the length of the central tubular conduit, the interior of each of the rotatable tubular members being in fluid communication with the interior of the central tubular conduit;

(c) a plurality of tubular sparging elements secured at a ninety-degree angle to each of the plurality of rotatable tubular members, each of the plurality of tubular sparging elements being in fluid communication with the interior of the rotatable tubular member to which it is secured;

(d) a plurality of link arms secured to the plurality of rotatable tubular members such that the link arms can secure the rotatable members in a position normal to the central tubular conduit; and (e) a plurality of tubular sparging elements secured at a ninety-degree angle to each of the plurality of rotatable tubular members, each of the plurality of tubular sparging elements being in fluid communication with the interior of the rotatable tubular member to which it is secured.

The method of insertion comprises:

(A) inserting the collapsible sparger through the flanged opening;

(B) rotating the rotatable tubular member nearest the distal end into a position normal to the central tubular conduit;

(C) withdrawing the collapsible sparger sufficient distance to secure the link arms of the tubular member nearest the distal end into position to secure the tubular member nearest the distal end in a position normal to the central tubular conduit; and (D) repeating the steps (A) through (C) for each successive rotatable tubular member from said distal end until all of said plurality of rotatable tubular members are secure in a position normal to said central tubular conduit.

BRIEF DESCRIPTION OF THE DRAWINGS

FIG. 1 is a top view of the collapsible sparger of the present invention as installed in a vessel.

FIG. 2 is a side plan view of the sparger showing the placement of the rotatable elements.

DETAILED DESCRIPTION OF THE PREFERRED EMBODIMENT

For a detailed description of the preferred embodiment the reader is directed to the accompanying figures in which like components are given like reference numerals. There is shown a central tubular conduit 1 having one end inserted through a manhole 40 having a flange 20 on a vessel 10. The proximal end of the central tubular conduit 1 has a fitting 50 for connection to a source of fluid such as hydrogen. A flange 30 is provided attached to the central tubular element 1 for securing the sparger to flange 20 on vessel 10. Disposed at right angles along the length of the central tubular conduit 1 are short sparging elements 11.

Also spaced along the length of the central tubular conduit 1 are four rotatable tubular members 2, 3, 6 and 7. The rotatable member 3 is the same length as the combined length of the two rotatable members 6 and 7 while the rotatable member 2 is longer than member 3 so that the cross sectional area of the cylindrical reactor can be more efficiently covered. Rotatable member 3 rotates about connection 5 which also allows fluid communication between the interior of member 3 and the interior of central tubular conduit 1. Likewise rotatable member 2 rotates about connection 4 which also allows fluid communication between the interior of member 2 and the interior of central tubular conduit 1. Finally rotatable members 6 and 7 rotate about connection 13 which also allows fluid communication between the interior of members 6 and 7 and the interior of central tubular conduit 1.

Each of rotatable members 2, 3, 6 and 7 have a plurality of sparging elements 8 secured at a ninety-degree angle along their lengths. All of the sparging elements 8, and each rotating member 2, 3, 6 and 7, and central tubular conduit land the elements in fluid communication therewith have openings 9 to spray the fluid such as hydrogen into the interior of the vessel 10.

Rotatable member 3 is secured in a position cross wise of the central tubular conduit 1 by two link arms 12 and 13. Rotatable member 2 is secured cross wise the central tubular conduit 1 by two additional link arms and rotatable members 6 and 7 are secured cross wise the central tubular conduit 1 by link arms 16 and 17. The link arms are attached to the rotatable members and their securing points by conventional fasteners such as screws, bolts, nuts and washers.

While only four rotatable members are shown any number can be used to achieve the desired cross-sectional area coverage.

The collapsible sparger is installed by first aligning the rotatable members with the axis of the central tubular conduit and passing the entire apparatus through a flanged opening. The farthest rotatable member 3 is then rotated into position. The sparger is then withdrawn to expose the link arms 12 and 13 so that they may be secured. The sparger is then inserted again and the next rotatable member 2 is rotated into position. The sparger is then again withdrawn so that link arms 14 and 15 can be cured. The sparger is then reinserted and rotatable members 6 and 7 are rotated into position. The sparger is then withdrawn so that the link arms 16 and 17 can be secured. Finally the sparger is reinserted into position and the fange 30 secured to flange 20. Connection 50 may then be connected to the fluid source.

The invention claimed is:

1. A collapsible sparger for installation in a vessel through a flanged opening comprising:
    (a) a central tubular conduit having openings through the walls thereof, and having a distal insertion end and a proximal end such that said proximal extends outward of said vessel through said flange when said distal end is inserted into said vessel;
    (b) at least one rotatable tubular member having openings through the wall thereof, the interior of said rotatable tubular member being in fluid communication with the interior of said central tubular conduit; and
    (c) at least one link arm rotatably secured to said rotatable tubular member such that said link arm can secure said rotatable tubular member in a position cross wise of said central tubular conduit.

2. The collapsible sparger according to claim 1 comprising a plurality of rotatable tubular members having openings through the walls thereof disposed along the length of said central tubular conduit, the interior of each of said plurality of rotatable tubular members being in fluid communication with the interior of said central tubular conduit, and a plurality of link arms secured to said plurality of rotatable tubular members such that said link arms can secure said rotatable members in a position cross wise of said central tubular conduit.

3. The collapsible sparger according to claim 2 wherein said rotatable tubular members are secure in a position normal to said central tubular conduit by said link arms.

4. The collapsible sparger according to claim 3 further comprising a plurality of tubular sparging elements secured at a ninety-degree angle to each of said plurality of rotatable tubular members, each of said plurality of tubular sparging elements being in fluid communication with the interior of the rotatable tubular member to which it is secured.

5. A collapsible sparger for installation in a vessel through a flanged opening comprising:
    (a) a central tubular conduit having openings through the walls thereof, and having a distal insertion end and a proximal end such that said proximal extends outward of said vessel through said flange when said distal end is inserted into said vessel;
    (b) a plurality of rotatable tubular members rotatably secured along the length of said central tubular conduit, the interior of each of said rotatable tubular members being in fluid communication with the interior of said central tubular conduit;
    (c) plurality of tubular sparging elements secured at a ninety-degree angle to each of said plurality of rotatable tubular members, each of said plurality of tubular sparging elements being in fluid communication with the interior of the rotatable tubular member to which it is secured; and
    (d) a plurality of link arms secured to said plurality of rotatable tubular members such that said link arms can secure said rotatable members in a position normal to said central tubular conduit.

6. A method of installing a collapsible sparger inside a vessel through a flanged opening, said collapsible sparger having (a) a central tubular conduit having openings through the walls thereof, and having a distal insertion end and a proximal end such that said proximal end extends outward of said vessel through said flange when said distal end is inserted into said vessel; (b) a plurality of rotatable tubular members rotatably secured along the length of said central tubular conduit, the interior of each of said rotatable tubular members being in fluid communication with the interior of said central tubular conduit; (c) plurality of tubular sparging elements secured at a ninety-degree angle to each of said plurality of rotatable tubular members, each of said plurality of tubular sparging elements being in fluid communication with the interior of the rotatable tubular member to which it is secured; and (d) a plurality of link arms secured to said plurality of rotatable tubular members such that said link arms can secure said rotatable members in a position normal to said central tubular conduit, comprising the steps of:
    (A) inserting the collapsible sparger through said flanged opening with the rotatable tubular members aligned with the axis of the central tubular conduit;
    (B) rotating the rotatable tubular member nearest the distal end into a position normal to the central tubular conduit;
    (C) withdrawing the collapsible sparger sufficient distance to secure the link arms of the tubular member nearest the distal end into position to secure the tubular member nearest the distal end in a position normal to the central tubular conduit; and
    (D) repeating the steps (A) through (C) for each successive rotatable tubular member from said distal end until all of said plurality of rotatable tubular members are secure in a position normal to said central tubular conduit.

* * * * *